(12) United States Patent
Baber (10) Patent No.: US 7,168,897 B2
(45) Date of Patent: Jan. 30, 2007

(54) PLANING/CHAMFERING ATTACHMENT FOR A ROTARY HAND TOOL

(75) Inventor: Brad M. Baber, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 10/818,915

(22) Filed: Apr. 6, 2004

(65) Prior Publication Data

US 2005/0220554 A1    Oct. 6, 2005

(51) Int. Cl.
    *B23C 1/20* (2006.01)
(52) U.S. Cl. ............... 409/180; 409/181; 409/138; 144/154.5; 144/117.1
(58) Field of Classification Search ............ 409/181, 409/182, 175, 178, 180, 138, 179; 144/136.95, 144/154.5, 117.1, 114.1, 131, 137, 117.2, 144/117.3, 144.51, 144.1
See application file for complete search history.

(56) References Cited

U.S. PATENT DOCUMENTS

| | | | | |
|---|---|---|---|---|
| 2,401,490 | A | * | 6/1946 | Little .................. 408/72 R |
| 2,649,874 | A | | 8/1953 | Konopa |
| 2,670,018 | A | | 2/1954 | Coates |
| 2,765,825 | A | * | 10/1956 | Neilson .................. 144/83 |
| 2,771,104 | A | * | 11/1956 | Saxe .................. 144/114.1 |
| 2,997,081 | A | * | 8/1961 | Christophersen ...... 144/134.1 |
| 3,040,631 | A | * | 6/1962 | Skantz .................. 409/181 |
| 3,085,476 | A | * | 4/1963 | Skerbinc et al. .......... 409/181 |
| 3,274,889 | A | * | 9/1966 | Ferris .................. 409/180 |
| 4,030,402 | A | | 6/1977 | Onsrud |
| 4,357,817 | A | | 11/1982 | Linsinger |
| 4,359,302 | A | | 11/1982 | Payne |
| 4,433,710 | A | | 2/1984 | Posta |
| 4,566,512 | A | * | 1/1986 | Wilson .................. 144/154.5 |
| 4,674,548 | A | | 6/1987 | Mills et al. |
| 5,062,750 | A | | 11/1991 | Oosterhof |
| 5,152,644 | A | * | 10/1992 | Mathews et al. ......... 409/181 |
| 5,224,230 | A | | 7/1993 | Vanicsek et al. |
| 5,224,803 | A | | 7/1993 | Lallier |

(Continued)

FOREIGN PATENT DOCUMENTS

DE          954737       12/1956

(Continued)

*Primary Examiner*—Daniel W. Howell
(74) *Attorney, Agent, or Firm*—Greer, Burns & Crain, Ltd.

(57) ABSTRACT

A planing attachment for a rotary hand tool of the type having a generally cylindrical body with an output shaft at a nose end thereof to which a cutting bit can be attached, the attachment being configured at an attaching end to matingly engage the nose end of the hand tool. The attachment includes a housing having an attaching end portion and a planing tool end portion, wherein the attaching end portion is configured to matingly engage the nose end of the rotary hand tool, and a leading plane and a trailing plane are configured wherein one of the planes is disposed on opposite sides of the cutting bit, and wherein the leading plane is elevated relative to the trailing plane by a distance proportional to the depth of cut made by the cutting bit. The attachment further includes a longitudinal cavity disposed between the leading plane and the trailing plane and is configured to receive the cutting bit therein, a cutting bit support disposed at the planing tool end portion of the attachment.

41 Claims, 8 Drawing Sheets

U.S. PATENT DOCUMENTS

| | | | | |
|---|---|---|---|---|
| 5,343,910 A | * | 9/1994 | Reines | 144/154.5 |
| 6,068,543 A | | 5/2000 | Renn | |
| 6,491,483 B1 | | 12/2002 | Ford | |
| 6,796,755 B1 | * | 9/2004 | Angeloni | 409/182 |
| 2004/0042862 A1 | | 3/2004 | Angeloni | |

FOREIGN PATENT DOCUMENTS

| | | | |
|---|---|---|---|
| EP | 1180420 | | 2/2002 |
| FR | 2439651 | | 5/1980 |
| GB | 2033837 A | * | 5/1980 |

* cited by examiner

PLANING/CHAMFERING ATTACHMENT FOR A ROTARY HAND TOOL

BACKGROUND OF THE INVENTION

The present invention generally relates to hand tools and more particularly to rotary hand tool accessories.

Portable powered planers have long been used to trim a side or an end of a wooden door so that it will properly fit within a frame, among the many examples of planing and chamfering operations that woodworkers and artisans often perform. Many commercially available portable planing power tools typically include a rotatable cutter drum assembly in which a cutting blade is mounted in a housing assembly that has an electric motor. The drum assembly is disposed between a front shoe and a rear base plate, in a manner whereby the outer reach of the cutting blade is substantially at the same plane of the bottom of the base plate. The front shoe has a flat planar bottom surface that is vertically adjustable relative to the rear base plate to control the amount of material that will be removed as the planer is moved forwardly along a work piece during operation. Many such planers are marketed under the Bosch trademark in the United States by the Robert Bosch Tool Corporation of Broadview, Ill.

However, such handheld planers are designed to perform commercial planing operations over an extended life and are therefore larger and heavier than is often needed for occasional use or for lighter or smaller planing or chamfering operations that may be carried out using a small rotary hand tool that is useful for performing many other types of operations.

SUMMARY OF THE INVENTION

An embodiment of the present invention includes a planing attachment for a rotary hand tool of the type that has a generally cylindrical body with a nose portion through which an output shaft extends, and a collet system, chuck or other mechanism for holding a cutting bit, preferably a spiral saw or cutting bit. The attachment preferably includes a housing having an attaching end portion and a planing tool end portion, wherein the attaching end portion is configured to matingly engage the nose portion of the rotary hand tool. The cutting bit extends from the output shaft of the rotary hand tool through a longitudinal cavity of the attachment housing, on either side of which is disposed a planar surface to control the depth of cut of the cutting bit. A bit support assembly is preferably disposed at the planing tool end portion of the accessory housing to support the cutting bit during operation of the rotary hand tool.

DETAILED DESCRIPTION OF THE PREFERRED EMBODIMENTS

Figure 1:
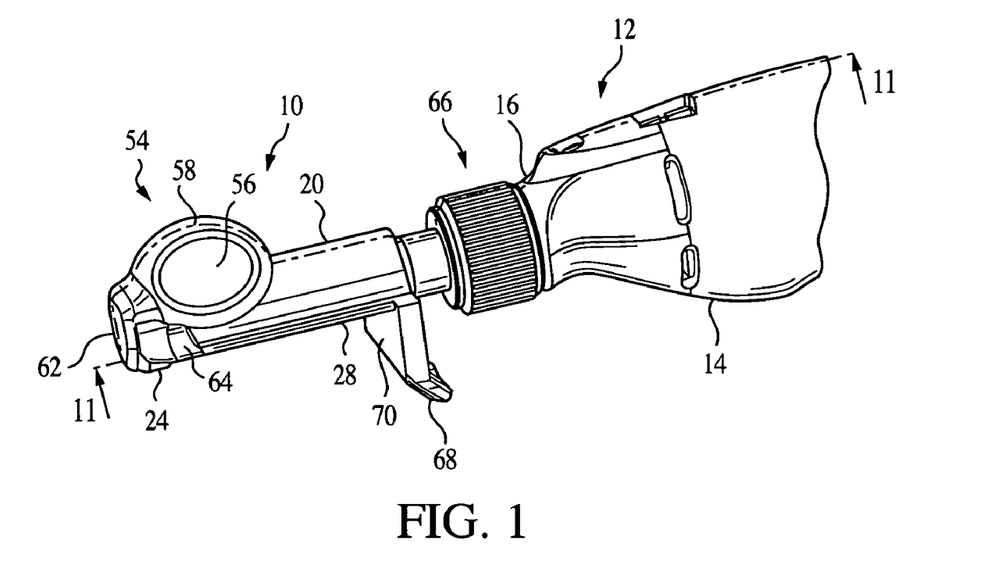
FIG. 1 is a side elevational view of an embodiment of the attachment of the instant invention coupled to an exemplary rotary hand tool.
Figure 2:
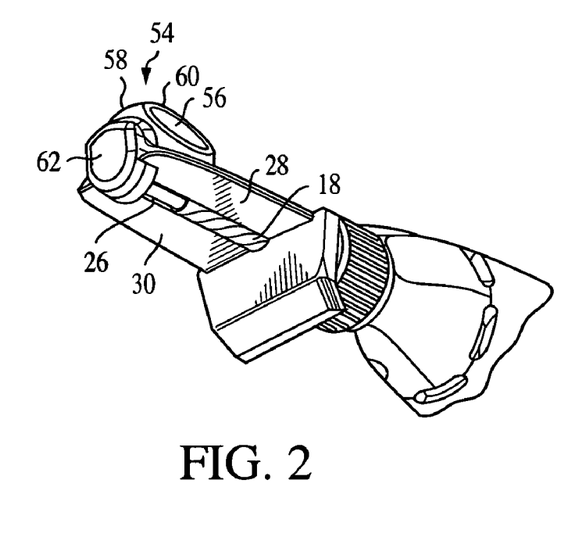
FIG. 2 is a bottom perspective view of the attachment and exemplary rotary hand tool illustrated in FIG. 1.

Turning now to FIG. 1, an embodiment of the present invention includes a planing attachment, designated generally at 10, for a rotary hand tool 12 of the type having a generally cylindrical body 14 with an output shaft 15 at a nose end 16 thereof to which a rotating cutting bit 18 (best shown in FIG. 2) is secured by a collet system (not shown) or other mounting mechanism, such as a chuck (not shown), and includes a pilot end (not shown) at an opposite end thereof. The collet system preferably includes a collet nut (not shown) and a collet (not shown).

Figure 6:
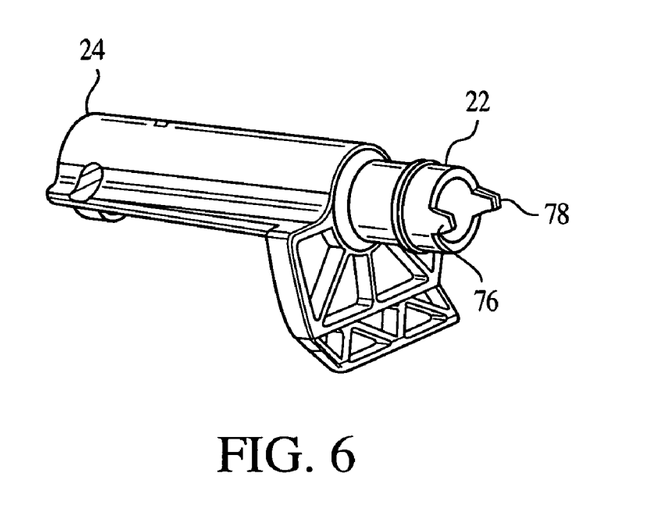
FIG. 6 is side elevational view of the attachment illustrated in FIG. 1.
Figure 7:
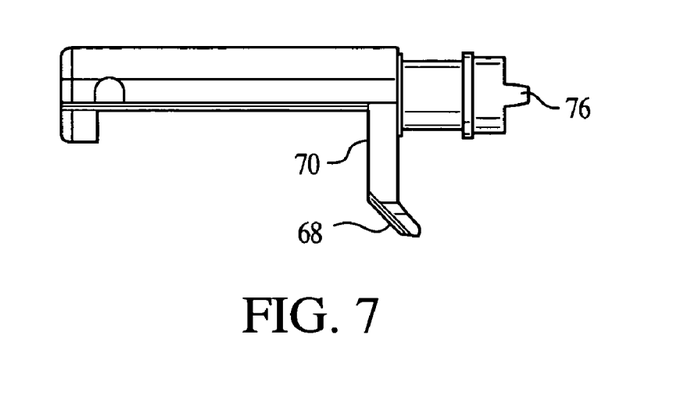
FIG. 7 is a side elevational view of the attachment illustrated in FIG. 1.
Figure 8A:
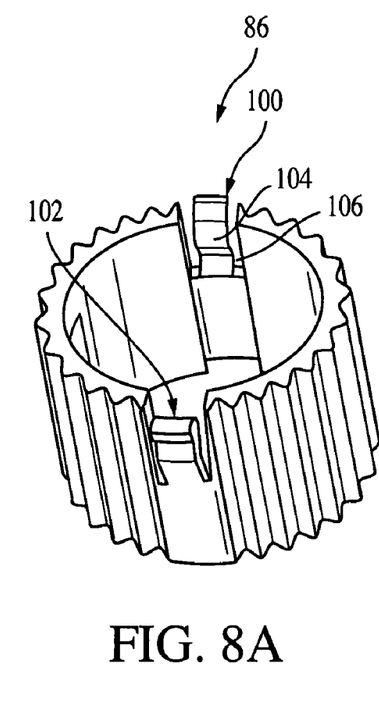
FIG. 8 is a side perspective view of an embodiment of the annular collar of the coupling assembly and perspective views of the inner sleeve halves of the coupling assembly of the instant invention.
Figure 8B:
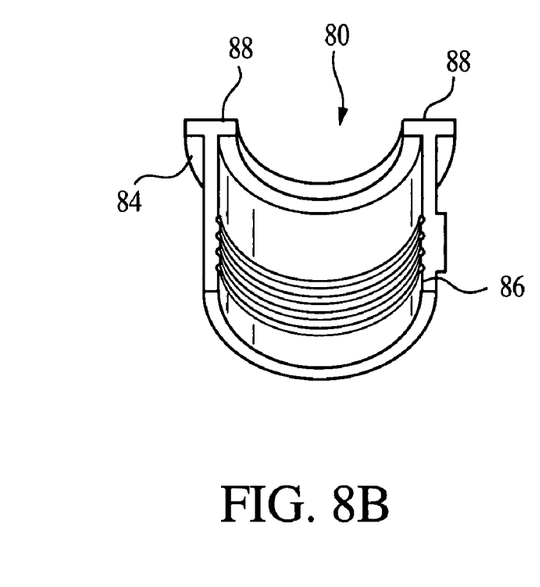
Figure 8C:
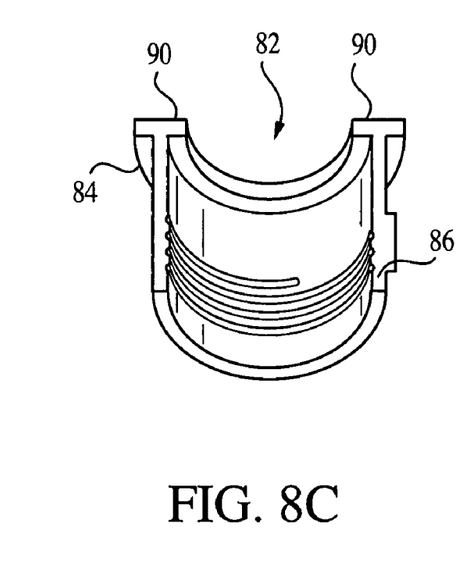

The planing attachment 10 is configured at an attaching end to matingly engage the nose end of the rotary hand tool 12. The attachment 10 preferably includes a generally cylindrical housing 20 having an attaching end portion 22 (best shown in FIG. 6) and a planing tool end portion 24, wherein the attaching end portion is configured to matingly engage the nose end 16 of the rotary hand tool 12. The cutting bit 18 includes a pilot 18a, cutting portion 18b, and shank portion 18c, and extends from the output shaft of the rotary hand tool 12 through a longitudinal cavity 26 (best shown in FIG. 2) of the housing 20, on either side of which is disposed either a leading plane 28 or a trailing plane 30 to guide the cutting bit. A bit support assembly, designated generally at 32, is preferably disposed at the planing tool end portion 24 of the housing 20 to support the pilot end 18a of the cutting bit 18 during operation of the rotary hand tool.

Figure 3:
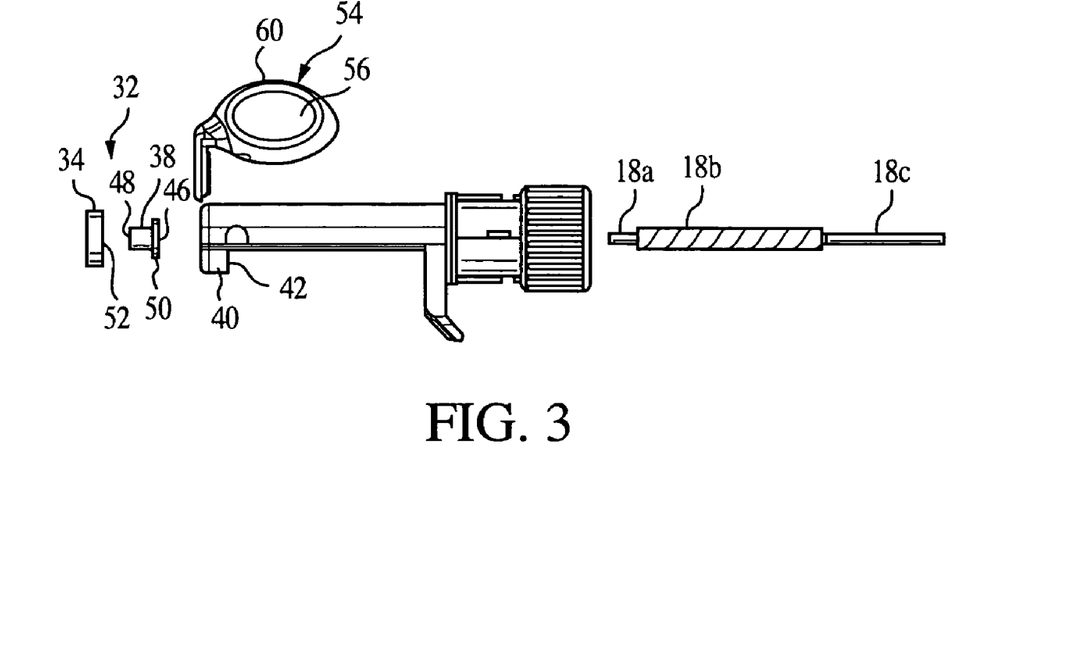
FIG. 3 is a side elevational view of the attachment illustrated in FIG. 1.
Figure 4:
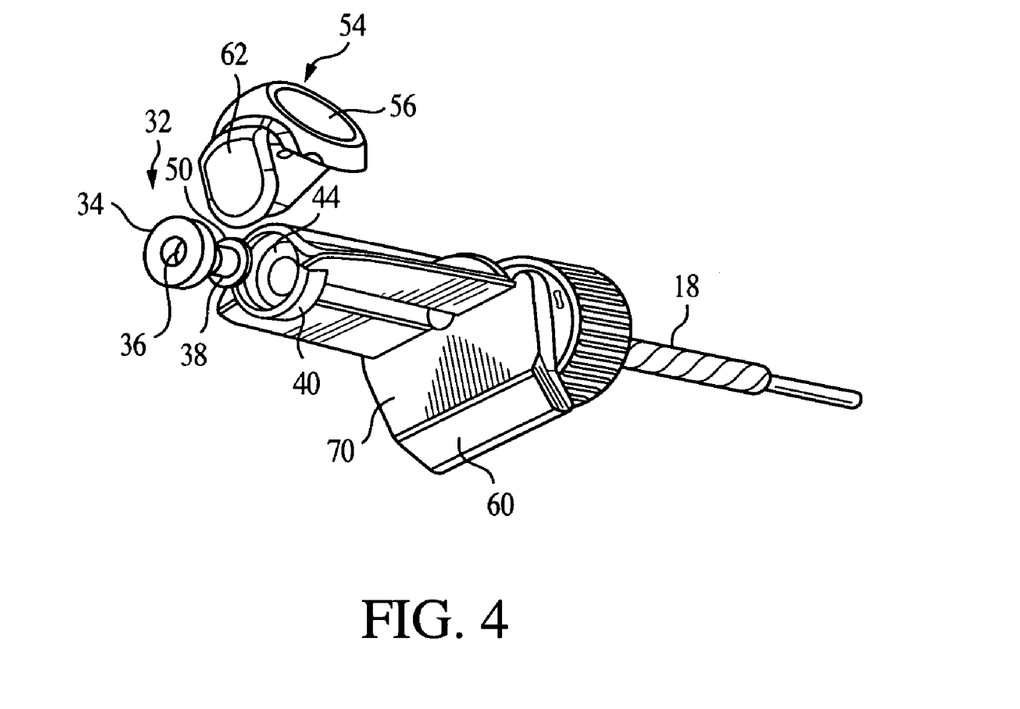
FIG. 4 is a bottom exploded perspective view of the attachment illustrated in FIG. 1.
Figure 5:
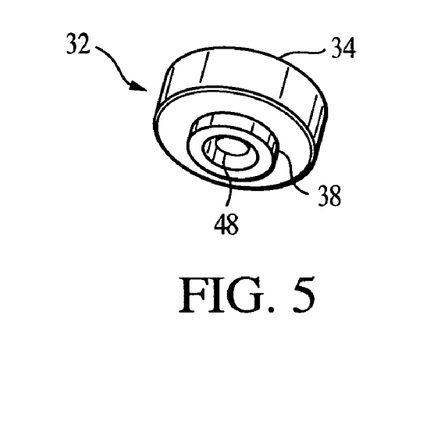
FIG. 5 is an embodiment of the bit support assembly of the instant invention.

During operation, the cutting bit 18 rotates at a speed sufficient to facilitate cutting of the work surface by the cutting bit 18, such as between zero and 35,000 rpm. However, vibrational motions caused by the rotational speed of the cutting bit 18 may render the cutting bit 18 susceptible to erratic or irregular cutting, which can interfere with the precision operation of the planing attachment 10. Accordingly, and turning to FIGS. 3, 4 and 5, the instant invention provides the bit support assembly 32, which preferably includes at least a bearing 34 having a central orifice 36. A bushing 38 configured to matingly engage the orifice of the bearing may also be provided in alternative embodiments of the bit support assembly 32.

More specifically, in the preferred embodiment, the longitudinal cavity 26 extends from the attaching end portion 22 of the attachment housing 20 to the planing tool end portion 24, at which the planing tool end portion is preferably disposed in a generally hollow annular ring 40 through which the cutting bit 18 extends. The annular ring 40, which is preferably unitary with the attachment housing 20, includes a variable inner diameter such that a minor inner diameter is provided near an inner end face 42 of the annular ring that is nearer to the attaching end portion 22 of the housing, and that a major inner diameter is provided toward an outer end face 44 of the annular ring that is nearer to the planing tool end portion 24 of the housing. In the preferred embodiment, the minor inner diameter is smaller than the major inner diameter and thus, an opening at the inner end face 42 of the annular ring 40 is smaller than an opening at the outer end face 24.

The bit support assembly 32 is accordingly sized and configured to nest within the annular ring 40. To this end, the bearing 34, which is preferably composed of a relatively hard material such as carbon steel, includes an outer circumference having a predetermined size such that the predetermined size corresponds generally to the major inner diameter of the annular ring 40. Additionally, the central orifice 36 of the bearing includes a diameter having a predetermined size that is preferably smaller than that of the major inner diameter but at least slightly larger than that of the pilot end 18a of cutting bit 18 so that the cutting bit may pass through the central orifice.

Similarly, the bushing 38, when provided, is preferably composed of a relatively soft material such as bronze or a powdered metal equivalent, and is generally hollow and cylindrical in shape, having first and second open ends 46, 48 with a central longitudinal cavity extending therebetween. An annular flange 50 radiates from the first open end 46. To engage the bearing 34 therefore, the second open end 48 is sized and configured to snugly and matingly engage the central orifice 36 of the bearing, preferably secured to one another via frictional engagement. In addition to matingly engaging one another in a friction fit, both the bushing 38 and the bearing 34 may optionally include threading so that the bushing and bearing may be coupled in a threaded engagement. The flange 50 provided at the attaching end portion 46 of the bushing 38 prevents the generally cylindrical profile of the bushing from sliding through the central orifice 36 in a direction of the planing tool end portion 24 of the housing 20.

The junction separating the minor and major inner diameters of the annular ring 40 of the housing 20 may include an annular collar, or may taper gradually from the at least slightly larger major inner diameter to the minor inner diameter. For example, where the junction includes an annular collar (not shown), when the bearing 34 and bushing 38 are coupled, a planar surface of the annular ring 40 preferably abuts a corresponding first planar surface 52 of the bearing 36.

Typically, the cutting bit 18 is supported within the bit support assembly 32, which preferably remains stationary while the cutting bit rotates. More specifically, the pilot end 18a of the cutting bit 18 extends through either the bearing 34 or the combination of the bushing 38 and the bearing, which ideally are unaffected by the rotation of the cutting bit. However, because the rotating cutting bit 18 frequently contacts the bit support assembly 32 during rotation, the bit support assembly of the instant invention is preferably configured and arranged so that it can respond to aberrant rotation by the cutting bit 18. Frequently, even when functioning within acceptable tolerances, the cutting bit 18 will rotate and contact a surface of the central longitudinal cavity within the bushing 38. Thus, to account for this contact, the bushing 38 is configured to be rotatable with the cutting bit 18 when necessary. The bit support assembly 32 preferably contacts the pilot end 18a of the cutting bit 18 and an inner portion of the bushing 38 rotates with the cutting bit and provides radial support for the cutting bit.

The pilot end 18a of the cutting bit 18 preferably includes a diameter that is at least slightly smaller than that of the cutting portion 18b of the cutting bit so that the pilot end fits rather loosely within the bit support assembly 32. During operation, the operator brings the cutting bit 18 into contact with a work surface, thereby flexing the cutting bit and bringing the pilot end 18a of the cutting bit into contact with the bit support assembly 32, either within the central longitudinal cavity of the bushing 38 or the central orifice 36 of the bearing 34. Because the bit support assembly 32 is preferably configured to rotate, the friction between the bit support assembly and the cutting bit 18 will cause them to rotate together.

For example, where the bit support assembly 32 includes the bearing 34 without the bushing 38, the central orifice 36 is configured to loosely retain the pilot end 18a of the cutting bit 18 therein. When contact is made between the cutting bit 18 and the central orifice 36 during operation, the cutting bit and the bearing 34 will rotate together.

Where the bit support assembly 32 includes both the bushing 38 and the bearing 34, the central longitudinal cavity of the bushing is configured to loosely retain the pilot end 18a of the cutting bit 18 therein, while the central orifice 36 of the bearing is sized and configured to matingly engage the bushing. During operation, contact between the pilot end 18a of the cutting bit 18 and the central longitudinal cavity of the bushing 38, the friction generated therefrom will cause the cutting bit and bushing to rotate together. In turn, friction generated from the contact of the bushing 38 and the central orifice 36 of the bearing 34 will cause an inner race (not shown) of the bearing to rotate with both the cutting bit 18 and the bushing, while the outer race (not shown) remains stationary. Preferably, the bushing 38 is composed of a material that is at least slightly softer than that of the cutting bit 18, generating additional friction, which in turn causes rotation of the two elements together.

The bit support assembly 32 retains the cutting bit 18, and as such, it is preferably configured to be assembled within the housing 20 of the attachment 10. Accordingly, the predetermined outer circumference of the bearing 34 is sized and configured to be at least slightly smaller than the major inner diameter toward the outer end face 44 of the annular ring 40. Thus, either prior to or following the coupling of the bushing 38 to the bearing 34, the bearing may be coupled to the housing 20 of the attachment 10 by inserting the bearing into the major inner diameter of the annular ring 40 in a press fit engagement, wherein the orientation of the bearing is such that a central axis thereof is common with a rotational axis of the cutting bit 18.

Similarly, either prior to or following the coupling of the bushing 38 to the bearing 34, the bushing may be coupled to the minor inner diameter of the annular ring 40 of the housing 20. The generally cylindrical bushing 38 is inserted into the minor inner diameter of the annular ring 40, but is prevented from passing entirely through the minor inner diameter via the flange 50, which acts as a mechanical stop insofar as its diameter is at least slightly larger than that of the minor inner diameter of the annular ring 40 of the housing 20.

During operation, when the cutting bit 18 is coupled to the rotary hand tool 12, the cutting bit extends from the output shaft, through the longitudinal cavity 26, and in the absence of the bit support assembly 32 of the instant invention, extends generally evenly with the planing tool end portion 24 or slightly outwardly from the planing tool end portion 24 of the housing 20. Since both the first or major inner diameters of the annular ring 40 are preferably significantly larger than a diameter of the cutting bit 18, the cutting bit is supported primarily by the collet system or other mechanism that couples the cutting bit to the rotary hand tool 12. However, when the bit support assembly 32 is provided, additional support is conferred in a number of ways.

The preferred structure of the bushing 38 is such that the central longitudinal cavity extending therethrough is sized and configured to have a diameter that is smaller than that of the minor inner diameter of the annular ring 40 of the housing 20, but is at least slightly larger than the diameter of the cutting bit 18 so that the cutting bit may be inserted therein. Thus, the cutting bit 18 may be inserted into the first open end 46 of the bushing 38, through the central longitudinal cavity, and through the second open end 48 as well. However, because the diameter of the central longitudinal cavity extending through the bushing 38 is smaller than the diameter of the minor inner diameter of the annular ring 40, possible vibrational chatter is reduced insofar as the space in which the cutting bit 18 would ordinarily vibrate is reduced. In this manner, the cutting bit 18 is supported and confined.

Further, the bushing 38 is secured within the central orifice 36 of the bearing 34, and the bearing in turn is secured within the major inner diameter of the annular ring 40 of the housing 20. In this manner, the bit support assembly 32 is confined within the annular ring 40 so that the bit support assembly is stabilized from undesirable movement and slippage of the cutting bit 18.

The instant embodiment contemplates that a friction fit of the bearing 34, such as a press fit, either coupled to the bushing 38, or alone without the bushing, is sufficient to securely retain the bearing within the annular ring. However, depending on the specifications of the user, additional mechanisms may be provided to confer additional security to the coupling of the bit support assembly 32 within the annular ring 40.

Figure 11:
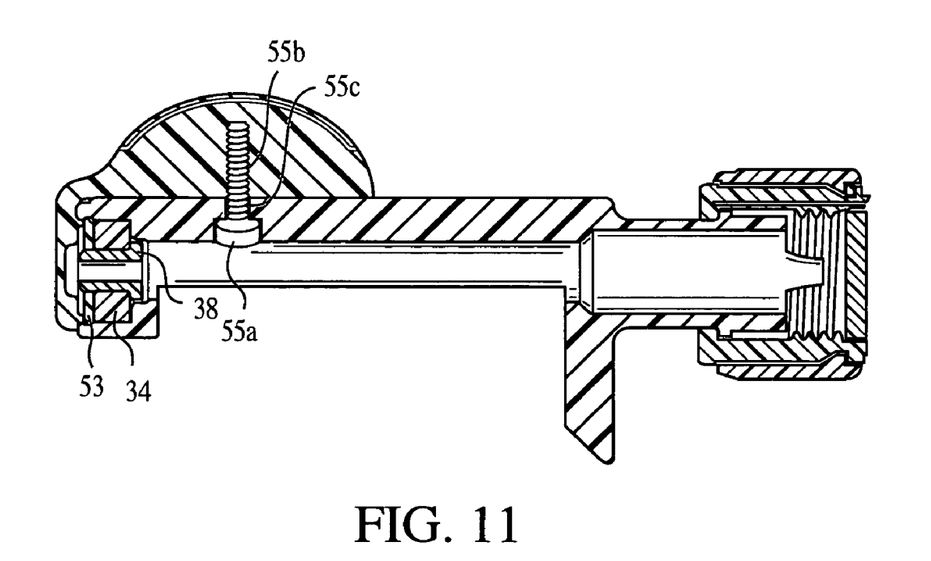
FIG. 11 is a side perspective cross-section of the attachment illustrated in FIG. 1, taken along the line 11—11.

For example, a retention ring (not shown), may be disposed within a retention ring groove 53 as illustrated in FIG. 11, may be included along an interior surface of the second interior diameter so that once the bit support assembly 32 is coupled thereto, the retention ring prevents slippage of the bit support assembly. Additionally, suitable metal to metal adhesives, such as those manufactured by the Loctite Corporation of Rocky Hill, Conn. may optionally be included to prevent slippage of the bit support assembly 32 as well. Preferably, adhesives would be used to reinforce a press fit between the bearing 34 and the annular ring 40.

Thus, during operation of the rotary hand tool 12 with the planing attachment 10 coupled thereto, the cutting bit 18 extending through the attachment housing 20 is preferably conferred additional support and stability via the bit support assembly 32. As the cutting bit 18 rotates, it is confined to rotational motion by at least the bearing 34, as well as by the bushing 38 that may be coupled to the bearing. In turn, undesirable movement by the bit support assembly 32 in response to any errant movement by the cutting bit 18 is confined by the stable coupling of the bit support assembly 32 to the housing 20. Moreover, while not necessary to the performance of the bit support assembly 32, the bearing 34 and bushing 38 are preferably made from predetermined composite materials such that a composite material of the bushing is preferably selected to be at least slightly softer than that of the bearing. Exemplary composite materials for the bushing 32 and bearing 34 are bronze and steel, respectively.

Additionally, turning now to FIGS. 1 through 4, a grip assembly, designated generally at 54, may also optionally be coupled to the planing tool end portion 24 of the housing. The grip assembly 54 may optionally be provided to enhance the grip of the operator during operation, as well as to confer some additional structural support for the coupling of the bit support assembly 32 to the annular ring 40. In an embodiment of the invention that includes the grip assembly 54, the grip assembly includes a gripping portion having a pair of opposing gripping surfaces 56, 58 disposed around at least a portion of the planing tool end portion 24 that are preferably concave in shape and are separated by a peak 60. Preferably, the grip assembly 54 is composed of a material such as ABS, glass filled ABS, nylon, glass filled nylon, or other plastic, as well as wood or metal. One exemplary material is 10% glass filled ABS. The grip assembly is preferably composed of a non-conductive material such as plastic or wood, because non-conductive materials promote insulation of heat generated from the bit support assembly 32, thereby preventing the heat from reach the operator's fingers.

During operation of the rotary hand tool 12 and the planing attachment 10 therefore, the operator grips the generally cylindrical body 20 of the attachment in a generally similar manner in which a person grips a pencil, for example. The thumb and an opposing finger, such as the index finger, contact and grip the concave gripping surfaces 56, 58 to firmly grasp and guide the attachment 10. The grip assembly 54 may be mounted to the attachment 10 in a variety of manners, such as via adhesive, snap fit or, as illustrated in FIG. 11, via a threaded mounting engagement that includes a pair orifices 55a, 55b, one of which is disposed on each of the attachment and the grip portion, and a threaded connector 55c maintaining the coupling of the grip portion to the attachment.

Because the planing tool end portion 24 is generally hollow having the bit support assembly 32 disposed therein with the cutting bit 18 extending therethrough, the grip assembly 54 may optionally include a downwardly depending flange 62 configured to engage the planing tool end portion of the attachment 10, thereby concealing the cutting bit 18 extending through the bit support assembly 32. Additionally, the provision of the flange 62 may promote coupling of the grip assembly 54 to the attachment 10. The flange 62 may also function to prevent contact between the operator and the bit support assembly 32.

Alternative embodiments of the planning attachment 10 of the instant invention may optionally include various functionalities to enhance operation of the planning attachment coupled to the rotary hand tool 12. Such optional functionalities may include, for example, offsetting the first and trailing planes 28, 30, a debris exhaust port 64, a coupling assembly 66 for coupling the attachment 10 to the rotary hand tool 12, a chamfer guide 68, and a guide fence 70.

Figure 12:
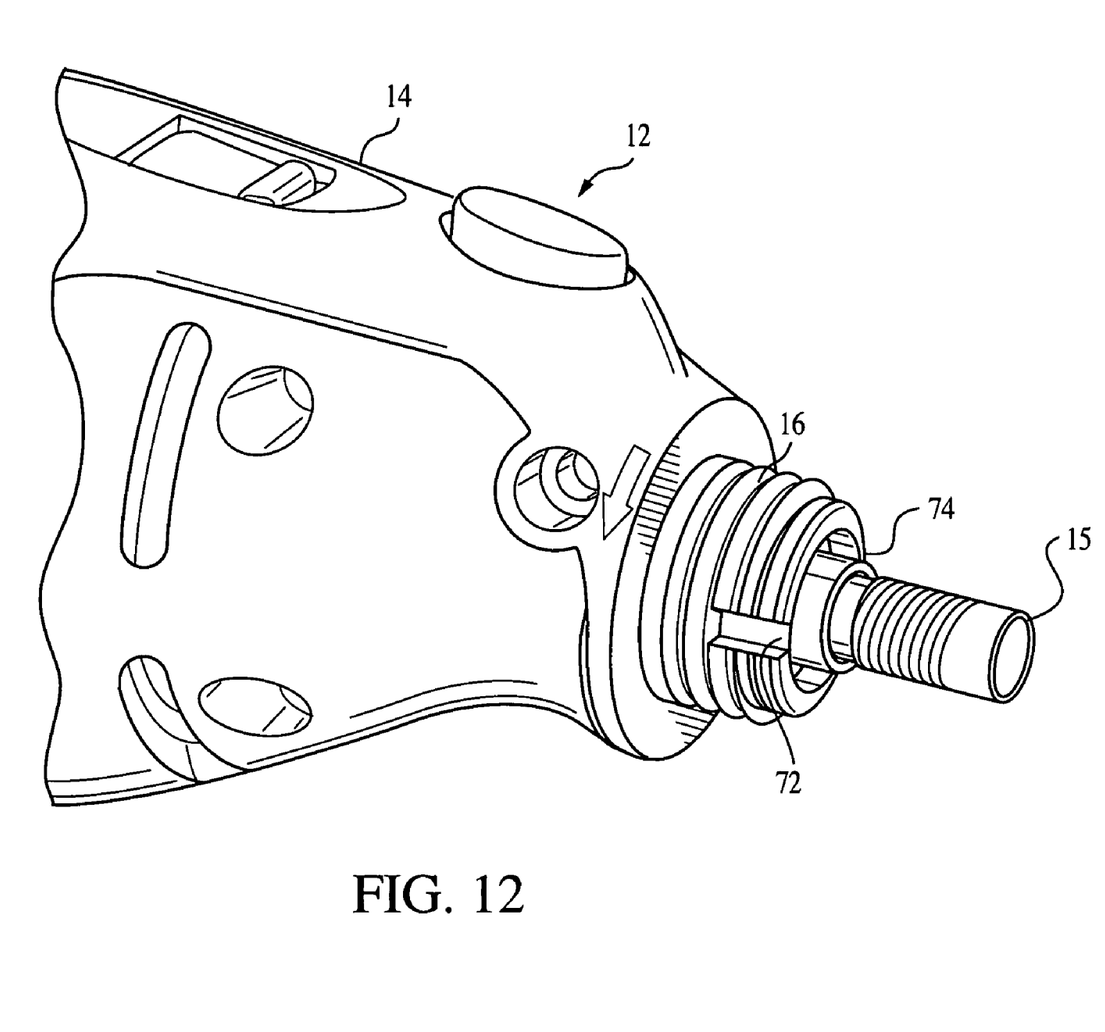
FIG. 12 is a side perspective view of an exemplary hand tool with which the attachment illustrated in FIG. 1 may be used.

Turning now to FIGS. 1 and 6 through 10, the planing attachment 10 of the instant invention is coupled to the rotary hand tool 12 during operation. However, the manner in which the planning attachment 10 is coupled to the rotary hand tool may differ depending upon the application or the particular rotary hand tool 12 to which the attachment is coupled. For exemplary purposes, the embodiment of the planing attachment illustrated in the drawings is shown with a rotary hand tool 10 of the type herein described, wherein the one end 16 includes threading along at least a portion of a circumference thereof, and which also include a pair of diametrically opposed recesses 72, 74 (FIG. 12) disposed within a circumference of an opening a the one end of the rotary hand tool. Accordingly, the attaching end portion 22 includes a pair of diametrically opposed projections 76, 78 that correspond to, and matingly engage, the recesses disposed at the one end of the rotary hand tool 10. The projections 76, 78 and the corresponding recesses 72, 74 may assume a variety of mating promoting the coupling of the attachment 10 to the rotary hand tool 12, the engagement of the projections 76, 78 and the recesses 72, 74 promotes proper alignment of that attachment in the two, thereby restricting the orientation in which the attachment may be coupled to the tool.

While the engagement of the projections 76, 78 within the recesses 72, 74 promotes coupling of the attachment 10 to the rotary hand tool 12, the coupling assembly, designated generally at 66, may also be included to lockingly engage the attachment and rotary hand tool. As is illustrated in FIG. 8, one preferred coupling assembly 66 is a sleeve assembly, which includes a pair of inner sleeve halves 80, 82, each of which include a radial flange 84 at one end thereof and internal threading 85 disposed along at least a portion of an internal circumference. The coupling assembly 66 preferably also includes an annular collar 86 that is configured to matingly receive the assembled sleeve halves 80, 82.

The assembled sleeve halves 80, 82 are configured to be assembled to one another to form an internally threaded annular ring that threadedly engages the one end of the rotary hand tool 12. The instant invention contemplates various engagement mechanisms for assembling the sleeve halves 80, 82 to one another, but for purposes of illustration, the embodiment illustrated in FIGS. 8A–8C and 9A–9B illustrate one exemplary assembly. Preferably, one sleeve half 80 includes a pair of posts 88a extending from the end of the sleeve half nearest the radial flange 84 on an internal surface thereof. A second pair of posts 88b may optionally be provided near an end of the sleeve half 80 that includes the internal threading 85. A pair of corresponding recesses 90a are accordingly disposed within the other sleeve half 82 at an end of the sleeve half nearest the radial flange 84 and are sized and configured to snugly and matingly receive the posts 88a. When the second pair of posts 88b are included on the one sleeve half 80, a second pair of corresponding recesses 90b are also included at an end of the second sleeve half 82 nearest the internal threading 85. To prevent inadvertent combination of otherwise alike sleeve halves 80, 82, the sleeve halves may optionally be differentiated in that a single recess 91a may be disposed on a portion of the first sleeve half 80 near one of the posts 88a, while a corresponding recess 91b is included on the second sleeve half 82 near one of the recesses 90a.

Figure 9A:
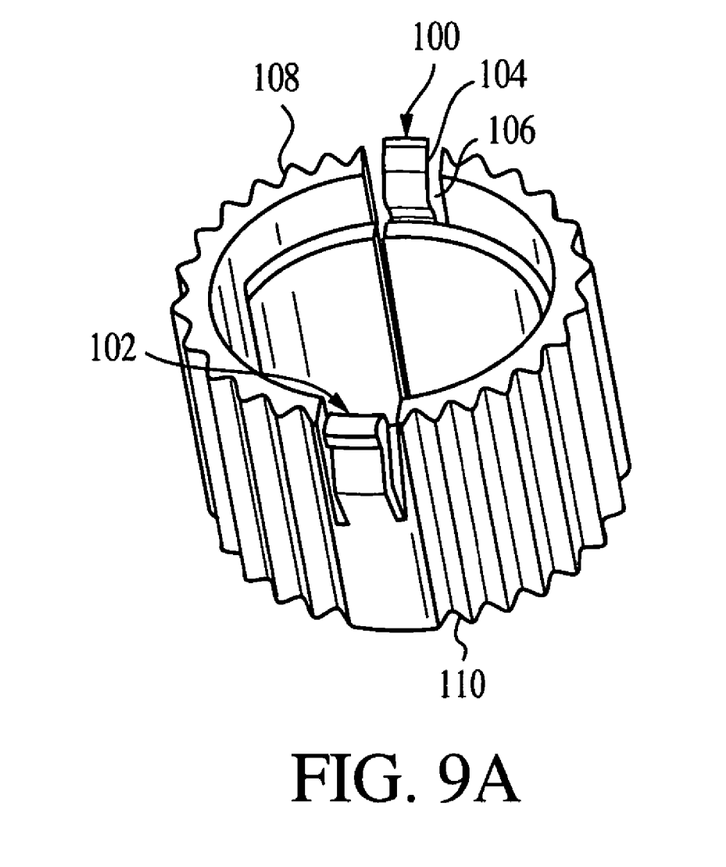
FIG. 9 is a side perspective view of the assembled sleeve halves and the annular collar of the coupling assembly illustrated in FIG. 8.
Figure 9B:
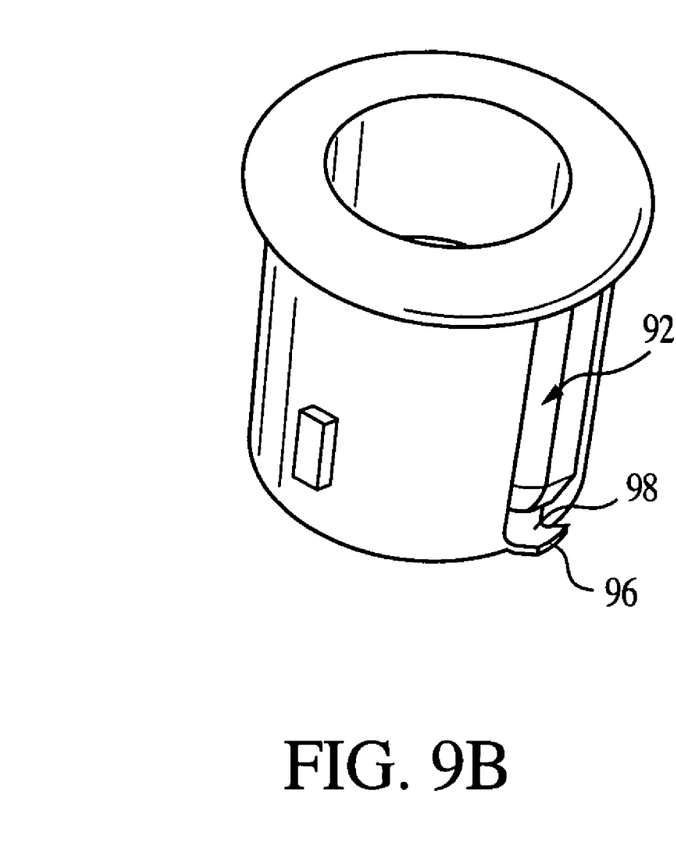
Figure 10:
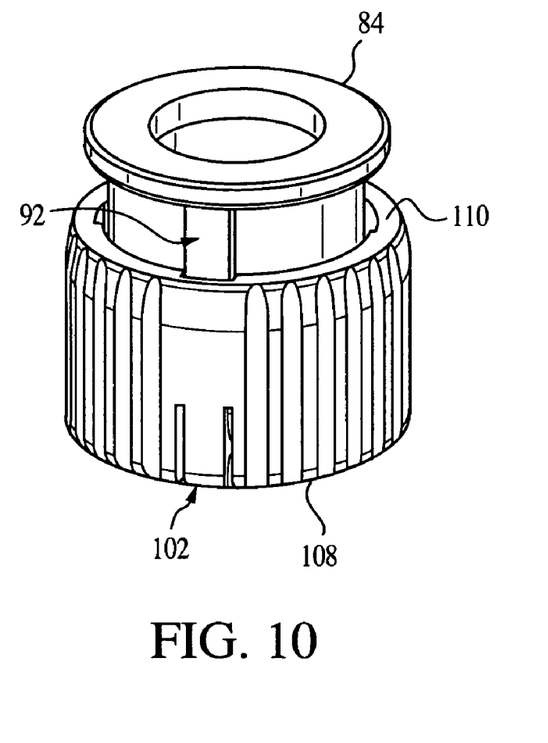
FIG. 10 is a side perspective view of the assembled sleeve halves coupled to the annular collar illustrated in FIG. 8.

In this manner, the sleeve halves 80, 82 may be brought together and assembled to one another as illustrated in FIG. 9B, with the ends of the sleeve halves 80, 82 having the radial flanges 84 preferably being aligned with one another to create a circumferential flange. Preferably, the sleeve halves 80, 82 are assembled to one another to enclose the attaching end portion of the attachment 22, with the ends of the sleeve halves having the radial flanges 84 oriented to face the planing tool end portion 24 of the attachment 10 and an opposite end of the sleeve halves 80, 82 oriented to face the attaching end portion 22 of the attachment.

To secure the sleeve halves 80, 82 to one another, the coupling assembly 66 preferably includes the annular collar 86 to matingly receive the assembled sleeve halves therein, and to subsequently promote coupling of the attachment 10 to the rotary hand tool 12. Thus, each of the sleeve halves 80, 82 and the annular collar 86 include features to promote coupling of the assembled sleeve halves to the annular collar.

Accordingly, again turning to FIGS. 8 and 9, the circumference of the assembled sleeve halves 80, 82 includes at least one and preferably two alignment and locking mechanisms 92, 94 opposing one another on the circumference of the assembled sleeve halves. The alignment and locking mechanisms 92, 94, which are preferably generally rectangular in shape and extend axially along the circumference of the assembled sleeve halves 80, 82, each preferably include a locking flange 96 a sleeve recessed portion 98 at the end of the sleeve half opposite the radial flange 84. Accordingly, corresponding engagement slots 100, 102 are preferably disposed axially along the internal circumference of the annular collar 86, which preferably include a locking protrusion 104 and a collar recessed portion 106 at a trailing end 108 thereof.

Once the sleeve halves 80, 82 are assembled to one another over the attaching end portion 22 of the attachment 10, the alignment and locking mechanisms 92, 94 are aligned with a leading end 110 of the annular collar at the engagement slots 100, 102. The annular collar 86 slides over the assembled sleeve halves 80, 82 to receive the assembled sleeve halves. The engagement slots 100, 102 of the annular collar 86 are preferably coextensive with the inner circumference of the annular collar at the leading end 110 but are spring biased such that at the trailing end 108 of the annular collar, the engagement slots 100, 102 extend at least slightly away from an external circumference of the annular collar. However, the locking protrusion 104 extends into an interior of the annular collar 86. Thus, as the alignment and locking mechanisms 92, 94 slide within the engagement slots 100, 102, the locking flange 96 presses against the engagement slots in a direction away from the external circumference of the annular collar 86. Once the locking flange 96 encounters the collar recessed portion 106, the locking flange 96 locks within the collar recessed portion and is preferably prevented from further axial movement by the locking protrusion 104.

To further prevent additional axial movement of the now assembled sleeve halves 80, 82 and annular collar 86, the inner circumference of the annular collar 86 has a predetermined size that is configured to matingly receive the assembled sleeve halves 80, 82. However, the predetermined size of the inner circumference of the annular collar 86 is at least somewhat smaller than a diameter of the assembled sleeve halves 80, 82 at the radial flanges 84 thereof. Accordingly, the annular collar 86 may receive the assembled sleeve halves 80, 82, but the assembled sleeve halves are preferably prevented from sliding entirely therethrough by the radial flanges 84.

Thus, the coupling assembly 66 of the instant invention preferably includes the two sleeve halves 80, 82 coupled to one another to enclose the attaching end portion 22 of the attachment 10, with the radial flanges 84 thereof aligned to create the circumferential flange that faces the planing tool end portion 24 of the attachment. To couple the assembled sleeve halves 80, 82 with the annular collar 86, the leading end 110 of the annular collar is first brought into alignment with the end of the sleeve halves opposite the radial flanges 84, with the alignment and locking mechanisms 92, 94 being aligned with the engagement slots 100, 102. The assembled sleeve halves 80, 82 are slidably received within the annular collar 86, and locked together by the alignment and locking mechanisms 92, 94 and the engagement slots 100, 102, with the radial flanges 84 abutting leading end 110 of the annular collar. The radial flanges 84 also prevent further axial movement of the assembled sleeve halves 80, 82 within the annular collar 86. To couple the rotary hand tool 12 to the attachment 10 therefore, the threading at the one end 16 of the rotary hand tool threadedly engages the threading 85 within the sleeve halves 80, 82 to securely couple the rotary hand tool to the attachment, with the attaching end portion 22 of the attachment facing the one end of the rotary hand tool 12.

While movement of the assembled sleeve halves 80, 82 with respect to the annular collar 86 is restricted, the assembled coupling assembly 66 is preferably configured and arranged to permit at least some axial movement along the attachment 10 to which it is coupled. More specifically, the coupling assembly 66 is disposed around the attaching end portion 22 of the attachment, and when threaded to the rotary hand tool 12, obscure the projections 76, 78 and the corresponding recesses 72, 74 to which the projections are matingly engaged. However, it is desirable to have the projections 76, 78 at least partially exposed prior to coupling the attachment 10 to the rotary hand tool 12 so that the operator may visually perceive the projections and align them with the corresponding recesses 72, 74. Thus, when the coupling assembly 66 is coupled to the attachment 10, the coupling assembly preferably reciprocates in an axial direction for a predetermined length, such as 8 mm. In this manner, the coupling assembly 66 may be moved in a direction away from the projections 76, 78, and once the projections are coupled to the recesses 72, 74, the coupling assembly may be moved in a direction toward the projections so that it may be threaded onto the rotary hand tool 12.

Figure 13:
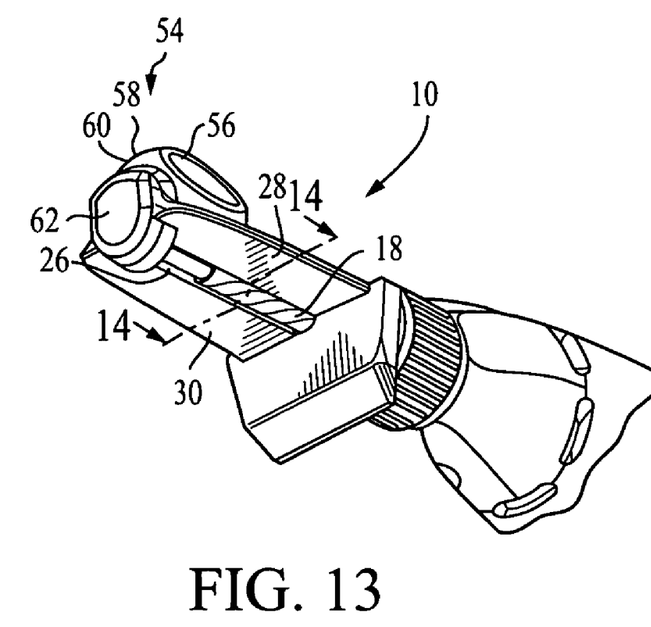
FIG. 13 is a side perspective view of an embodiment of the attachment of the instant invention.
Figure 14:
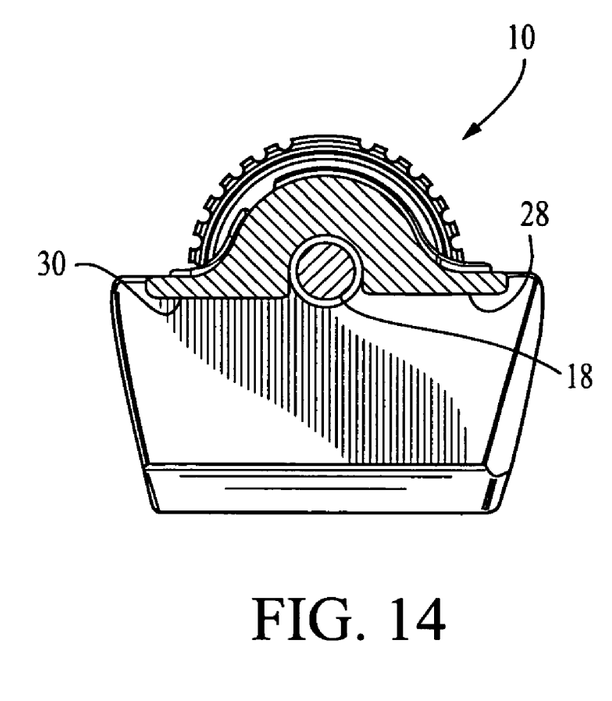
FIG. 14 is a front perspective cross-section of the attachment illustrated in FIG. 13, taken along the line 14—14.

As illustrated in FIGS. 13 and 14, still other embodiments may include another optional feature of the instant invention, which is the offsetting of the leading and trailing planes 28, 30. During operation of the planing attachment 10, an underside of the leading plane 28 acts as a leading plane to guide the operator so that the cutting bit 18 is applied to the work surface in a planar manner. Thus, an underside of the leading plane 28 includes a generally planar, generally rectangular underside surface that extends a predetermined distance from the central longitudinal cavity 26 in a direction generally perpendicular to the central longitudinal cavity. The central longitudinal cavity 26 has a predetermined depth such that a longitudinal axis of the central longitudinal cavity has a predetermined distance from the underside surface of the leading plane 28, wherein the predetermined depth is configured such that the cutting bit 18, when disposed therein, has a cutting surface that extends below the underside surface. In this way, as the underside surface is guided along the work surface, the cutting bit 18 that follows the underside surface contacts and cuts the work surface. Also, the coupling assembly 66 rotates about the attaching end portion 22 to promote threading onto the rotary hand tool 12.

However, once the work surface is cut, a profile of the work surface is necessarily reduced in dimension. Accordingly, an underside of the trailing plane 30 contacts the reduced profile of the work surface after it has been cut by the cutting bit and limits the depth of cut of the cutting bit. In this manner, the leading plane 28 contacts an uncut surface of the work surface, and the trailing plane 30 contacts the reduced surface following cutting of the work surface by the cutting bit 18. Preferably, a cutting surface of the cutting bit 18 does not extend below an underside of the trailing plane 30. Thus, with respect to an uncut work surface, the leading plane 28 is elevationally higher than the trailing plane 30, with a predetermined cutting depth of the cutting bit corresponding to a predetermined distance between the leading plane and the trailing plane.

Another optional feature that may be included with the planing attachment 10 of the instant invention is the debris exhaust port 64. During operation of the planing attachment 10, a work surface that is typically a wood surface is cut by the cutting bit 18. As portions of the wood surface are cut away, wood dust and particulate debris is generated at the work surface abutting the cutting bit 18. Accordingly, the instant invention may optionally include the debris exhaust port 64.

Preferably, the debris exhaust port 64 is an orifice disposed at the planing tool end portion 24 of the attachment 10, and preferably oriented such that debris is exhausted a predetermined direction, preferably in a direction in which the rotary hand tool 12 is being guided by the operator. Owing to the nature of its configuration, the auger-type configuration of a spiral saw type cutting bit 18 naturally forces debris in the direction of the planing tool end portion 24. The flutes (not shown) on the cutting bit gather dust, which is subsequently forced away from the rotary hand tool 12 to the planing tool end portion 24 of the attachment 10 to be exhausted. The relatively high rate of speed at which the cutting bit 18 is rotating combined with the bit's auger-type or "fan-like" action forces dust out of the debris exhaust port 64.

Another optional feature that may be included in the attachment 10 is the guide fence 70. The guide fence 70 may disposed at any desired angle relative to the first and trailing planes 28, 30 to promote precision angled cuts. For example, as illustrated in the figures, the guide fence 70 is disposed at a 90° with respect to the first and trailing planes 28, 30 to ensure a precise 90° cut. More specifically, as the operator guides the attachment 10 along a work surface, at least the leading plane 28 generally abuts the work surface to be cut. To prevent slippage of the leading plane 28 away from the work surface, which would compromise the fidelity of the angle at which the operator wishes to cut the work surface, herein 90°, the 90° guide fence 70 abuts a side surface of the work surface that is disposed at 90° with respect to the work surface. In this manner, the guide fence 70 functions to further maintain an accurate and precise 90° angled cut along the desired work surface.

Often, however, an operator will desire to cut the work surface at an angle other than 90°. Accordingly, another optional feature of the instant invention is the chamfering guide 68. While the chamfering guide 68 may be disposed at any angle desired by the manufacturer, the chamfering guide illustrated in the figures is a 45° chamfering guide, which provides a guide for alternatively angled cuts of 45°.

Assuming the work surface is disposed on a 90° work piece, when the operator wishes to make a 45° cut, the operator rotates the attachment 10 about the work surface until the chamfering guide 68 rests flush with the work surface. The operator may then guide the chamfering guide 68 along the work surface to create, in this instance, a 45° angled cut.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A planing attachment for a rotary hand tool of the type having a generally cylindrical body with an output shaft at a nose end thereof to which a cutting bit can be attached, said attachment being configured at an attaching end to matingly engage said nose end of said hand tool, said attachment comprising:
   a housing having an attaching end portion and a planing tool end portion, wherein said attaching end portion is configured to matingly engage the nose end of the rotary hand tool;
   a leading plane and a trailing plane configured wherein one of said planes is disposed on opposite sides of the cutting bit, with an underside of said leading plane being elevated relative to an underside of said trailing plane by a distance proportional to the depth of cut made by the cutting bit;
   a longitudinal cavity disposed between said leading plane and said trailing plane and configured to receive said cutting bit therein; and
   a cutting bit support disposed at said planing tool end portion and comprising a bearing having predetermined inner and outer diameters, and a generally cylindrical bushing having a first and second open ends for receiving the cutting bit therethrough.

2. A planing attachment for a rotary hand tool of the type having a generally cylindrical body with an output shaft at a nose end thereof to which a cutting bit can be attached, said attachment being configured at an attaching end to matingly engage said nose end of said hand tool, said attachment comprising:
   a housing having an attaching end portion and a planing tool end portion, wherein said attaching end portion is configured to matingly engage the nose end of the rotary hand tool;
   a leading plane and a trailing plane configured wherein one of said planes is disposed on opposite sides of the cutting bit;
   a longitudinal cavity disposed between said leading plane and said trailing plane and configured to receive said cutting bit therein; and
   a cutting bit support disposed at said planing tool end portion, wherein said cutting bit support comprises a bearing and a bushing, said bearing including a generally circular orifice for receiving said bushing, and said bushing including a generally cylindrical orifice for receiving the cutting bit therein.

3. The planing attachment of claim 1 wherein said bearing comprises steel and said bushing comprises bronze.

4. The planing attachment of claim 1 wherein said bushing comprises a material that is relatively softer than a composite material of the cutting bit.

5. The planing attachment of claim 1 wherein said predetermined outer diameter of said bearing is sized and configured to engage an inner diameter of said planing tool end portion of said attachment housing.

6. The planing attachment of claim 5 wherein said outer diameter of said bearing engages said inner diameter of said planing tool end portion of said housing in a press fit engagement.

7. The planing attachment of claim 1 wherein said second open end of said bushing includes a radial flange having a bearing face and a bit face.

8. The planing attachment of claim 7 wherein said bushing extends through said inner diameter of said bearing and wherein said bearing face of said bushing engages a corresponding surface of said bearing.

9. The planing attachment of claim 1 further comprising an annular ring disposed on an internal circumference of said planing tool end portion of said housing and configured to engage said bearing in a press fit engagement.

10. The planing attachment of claim 1 wherein said attaching end portion of said planing attachment housing includes an engagement mechanism that matingly engages the one end of the rotary hand tool.

11. The planing, attachment of claim 10 wherein said engagement mechanism comprises a pair of projections that matingly engage a corresponding pair of cavities disposed within the one end of the rotary hand tool.

12. The planing attachment of claim 10 wherein engagement mechanism further comprises a sleeve assembly configured to secure said attaching end portion of said attachment to the one end of the rotary hand tool.

13. The planing attachment of claim 12 wherein said sleeve assembly comprises a pair of internally threaded inner sleeve halves configured to enclose at least a portion of and an outer sleeve collar configured to receive and engage said inner sleeve halves within an internal cavity thereof.

14. The planing attachment of claim 1 wherein said planing tool end portion is further configured to include an ergonomic grip portion.

15. The planing attachment of claim 14 wherein said ergonomic grip portion extends radially from said planing tool end portion of said planing attachment housing.

16. The planing attachment of claim 14 wherein said ergonomic grip portion includes a downwardly depending rear panel that abuts and encloses said bit support.

17. The planing attachment of claim 14 wherein said ergonomic grip portion comprises a non-conductive material.

18. The planing attachment of claim 14 wherein said ergonomic grip portion comprises glass filled ABS.

19. The planing attachment of claim 14 wherein said ergonomic grip portion includes a pair of concave surfaces configured and arranged to oppose one another.

20. The planing attachment of claim 16 wherein said rear panel includes an interior surface that is configured to abut an end of the cutting bit opposite an end that is coupled to the hand tool.

21. The planing attachment of claim 1 wherein said planing tool end portion is further configured to include a debris ejection slot.

22. The planing attachment of claim 1 further comprising a guide member depending from said leading and trailing planes.

23. The planing attachment of claim 22 wherein said guide member comprises a generally planar panel depending downwardly in a direction generally perpendicular to said leading and trailing planes and an angle guide disposed at a predetermined angle with respect to said panel.

24. The planing attachment of claim 23 wherein said angle guide is disposed at a 45° with respect to said panel.

25. The planing attachment of claim 1 wherein said leading plane and said trailing plane are disposed to be parallel but vertically displaced with respect to one another.

26. The planing attachment of claim 25 wherein a predetermined cutting depth of the cutting bit corresponds to a predetermined distance between said leading plane and said trailing plane.

27. A planing attachment for a rotary hand tool of the type having a generally cylindrical body with an output shaft at one end thereof to which a proximal end of a cutting bit is coupled, said attachment being configured at the one end to matingly engage said hand tool, said attachment comprising:

coupling means for coupling said attachment to the rotary hand tool, said coupling means comprising a pair of projections extending from an end of the attachment to which the rotary hand tool is coupled, and which projections are configured to matingly engage a pair of corresponding cavities disposed on the rotary hand tool;

guide means for guiding the bit along a work surface;

means to receive a shank portion of the cutting bit therein, and wherefrom a distal end of the bit protrudes;

support means to support the distal end of the bit.

28. The planing attachment of claim 2 further comprising a debris ejection orifice disposed toward a planing tool end portion of said attachment.

29. A planing attachment for a rotary hand tool of the type having a generally cylindrical body with an output shaft at one end thereof to which a proximal end of a cutting bit is coupled, said attachment being configured at the one end to matingly engage said hand tool, said attachment comprising:

coupling means for coupling said attachment to the rotary hand tool, said coupling means comprising a pair of inner sleeve halves configured to couple with one another to enclose at least a portion of a attaching end portion of said attachment, and an outer sleeve collar configured to matingly engage the pair of assembled inner sleeve halves;

guide means for guiding the bit alone a work surface;

means to receive a shank portion of the cutting bit therein, and wherefrom a distal end of the bit protrudes;

support means to support the distal end of the bit.

30. The planing attachment of claim 27 wherein said guide means comprises a leading plane and a trailing plane configured to abut a work surface during operation of the rotary hand tool.

31. The planing attachment of claim 30 wherein an underside of said leading plane is configured to abut an uncut work surface while an underside of said trailing plane is configured to abut a cut work surface.

32. The planing attachment of claim 30 wherein said guide means further comprises a chamfer guide depending downwardly from the leading and trailing planes and configured to abut a work surface during operation of the rotary hand tool.

33. The planing attachment of claim 32 wherein said chamfer guide is configured to guide the rotary hand tool at a 45° angle.

34. The planing attachment of claim 27 wherein said support means comprises a bushing through which the cutting bit extends, and a bearing configured to matingly engage said bushing.

35. The planing attachment of claim 27 wherein said support means comprises a bushing having a cylindrical body with a radial flange at one end thereof and an inner diameter configured to receive the cutting bit therethrough, and a bearing having an inner diameter configured to receive the cylindrical body therethrough and to abut a corresponding surface of the radial flange.

36. The support means of claim 35 wherein an end of said attachment opposite an end coupled to the rotary hand tool includes an inner circumference configured to receive the bearing in a press-fit engagement.

37. The support means of claim 35 further comprising an annular ring disposed on an internal circumference of said attachment with which the bearing is configured to engage in a press fit engagement.

38. The attachment of claim 27 further comprising gripping means disposed at an end of said attachment opposite an end coupled to the rotary hand tool.

39. The attachment of claim 27 further comprising exhaust means for exhausting debris created during operation of said attachment.

40. A planing attachment for a rotary hand tool of the type having a generally cylindrical body with an output shaft at one end thereof to which a proximal end of a cutting bit is coupled, said attachment being configured at the one end to matingly engage said hand tool, said attachment comprising:

coupling means for coupling said attachment to the rotary hand tool guide means for guiding the bit along a work surface;

means to receive a shank portion of the cutting bit therein, and wherefrom a distal end of the bit protrudes;

support means to support the distal end of the bit; and a right angle guide means for guiding the attachment at a 90° angle to a side portion of a work surface.

41. The planing attachment of claim 2 wherein said debris ejection orifice is configured to eject dust in a direction of said leading plane.

* * * * *